(12) United States Patent
Love et al.

(10) Patent No.: US 8,172,132 B2
(45) Date of Patent: *May 8, 2012

(54) IDENTITY VERIFICATION SYSTEMS AND METHODS

(75) Inventors: Robin Love, Phoenix, AZ (US); Dzmitry Sabaleuski, Scottsdale, AZ (US); Todd Anderson, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/508,728

(22) Filed: Jul. 24, 2009

(65) Prior Publication Data

US 2009/0313069 A1 Dec. 17, 2009

Related U.S. Application Data

(63) Continuation of application No. 11/031,469, filed on Jan. 6, 2005, now Pat. No. 7,566,002.

(51) Int. Cl.
| | |
|---|---|
| *G06Q 10/00* | (2006.01) |
| *G06Q 20/00* | (2006.01) |
| *G06Q 40/00* | (2006.01) |
| *G07D 11/00* | (2006.01) |
| *G07F 19/00* | (2006.01) |
| *G06K 5/00* | (2006.01) |
| *G06F 7/08* | (2006.01) |

(52) U.S. Cl. .......... 235/379; 235/380; 235/381; 705/79; 705/18; 705/64; 705/75; 705/77; 705/7.11

(58) Field of Classification Search .......... 235/379–381; 705/7, 18, 64, 75, 77, 79
See application file for complete search history.

(56) References Cited

U.S. PATENT DOCUMENTS

| | | | |
|---|---|---|---|
| 5,386,104 A | 1/1995 | Sime | |
| 5,978,840 A | 11/1999 | Nguyen et al. | |
| 6,029,154 A * | 2/2000 | Pettitt | 705/44 |
| 6,202,055 B1 * | 3/2001 | Houvener et al. | 705/44 |
| 6,308,887 B1 | 10/2001 | Korman et al. | |
| 6,591,249 B2 | 7/2003 | Zoka | |
| 6,647,376 B1 | 11/2003 | Farrar et al. | |
| 6,681,328 B1 * | 1/2004 | Harris et al. | 713/175 |
| 6,980,970 B2 | 12/2005 | Krueger et al. | |
| 7,024,395 B1 | 4/2006 | McCown et al. | |
| 7,024,697 B2 * | 4/2006 | Nitaki | 726/26 |
| 7,177,846 B2 * | 2/2007 | Moenickheim et al. | 705/64 |
| 7,177,849 B2 | 2/2007 | Fieschi et al. | |

(Continued)

OTHER PUBLICATIONS

Concord EFS, Inc. brochure entitled "Risk Management Services", published on or before 2005, 8 pages.

(Continued)

*Primary Examiner* — Daniel Walsh
(74) *Attorney, Agent, or Firm* — Kilpatrick Townsend & Stockton LLP (57) ABSTRACT

Systems and methods are disclosed for verifying customer identifications. In one embodiment, the method comprises receiving, at a transaction gateway, a communication associated with a transaction initiated by a customer; determining the communication includes an identity verification request to verify encoded data obtained from an identification presented by the customer; routing the identity verification request to an identity verification service; receiving, from the identity verification service, a result including one or more identification values obtained from the encoded data; and transmitting the result to a requester associated with the communication.

29 Claims, 5 Drawing Sheets

U.S. PATENT DOCUMENTS

| | | | |
|---|---|---|---|
| 7,280,981 B2 | 10/2007 | Huang et al. | |
| 7,330,836 B2* | 2/2008 | Kausik | 705/50 |
| 7,566,002 B2* | 7/2009 | Love et al. | 235/380 |
| 7,752,132 B2* | 7/2010 | Stewart et al. | 705/40 |
| 8,016,185 B2* | 9/2011 | Modi | 235/379 |
| 2001/0000358 A1* | 4/2001 | Isomichi et al. | 713/201 |
| 2001/0005890 A1* | 6/2001 | Nitaki | 713/202 |
| 2002/0010633 A1 | 1/2002 | Brotherston | |
| 2002/0046092 A1* | 4/2002 | Ostroff | 705/14 |
| 2002/0055909 A1 | 5/2002 | Fung et al. | |
| 2002/0082989 A1 | 6/2002 | Fife et al. | |
| 2002/0111919 A1* | 8/2002 | Weller et al. | 705/67 |
| 2002/0120846 A1* | 8/2002 | Stewart et al. | 713/168 |
| 2002/0138351 A1* | 9/2002 | Houvener et al. | 705/18 |
| 2002/0153414 A1 | 10/2002 | Stoutenburg et al. | |
| 2002/0178112 A1 | 11/2002 | Goeller et al. | |
| 2002/0184103 A1* | 12/2002 | Shah et al. | 705/26 |
| 2002/0194138 A1* | 12/2002 | Dominguez et al. | 705/64 |
| 2002/0195485 A1* | 12/2002 | Pomerleau et al. | 235/379 |
| 2003/0009382 A1* | 1/2003 | D'Arbeloff et al. | 705/17 |
| 2003/0033249 A1 | 2/2003 | Ingram et al. | |
| 2003/0042301 A1 | 3/2003 | Rajasekaran et al. | |
| 2003/0069856 A1 | 4/2003 | Seifert et al. | |
| 2003/0110137 A1* | 6/2003 | Armingaud et al. | 705/64 |
| 2003/0163417 A1 | 8/2003 | Cachey et al. | |
| 2003/0172027 A1 | 9/2003 | Scott | |
| 2003/0212601 A1* | 11/2003 | Silva et al. | 705/17 |
| 2003/0212642 A1* | 11/2003 | Weller et al. | 705/67 |
| 2003/0233334 A1 | 12/2003 | Smith | |
| 2004/0019568 A1* | 1/2004 | Moenickheim et al. | 705/64 |
| 2004/0162780 A1 | 8/2004 | Booth | |
| 2004/0215963 A1 | 10/2004 | Kaplan | |
| 2004/0230536 A1 | 11/2004 | Fung et al. | |
| 2004/0260656 A1 | 12/2004 | Guthery | |
| 2005/0033686 A1 | 2/2005 | Peart et al. | |
| 2005/0049969 A1* | 3/2005 | Kane | 705/45 |
| 2005/0065855 A1* | 3/2005 | Geller | 705/26 |
| 2005/0102188 A1* | 5/2005 | Hutchison et al. | 705/26 |
| 2005/0102354 A1 | 5/2005 | Hollenbeck et al. | |
| 2005/0192892 A1 | 9/2005 | Willard | |
| 2005/0192896 A1* | 9/2005 | Hutchison et al. | 705/40 |
| 2005/0279827 A1 | 12/2005 | Mascavage et al. | |
| 2006/0015358 A1 | 1/2006 | Chua | |
| 2006/0144927 A1* | 7/2006 | Love et al. | 235/380 |
| 2006/0155998 A1 | 7/2006 | Dalton et al. | |
| 2006/0161435 A1 | 7/2006 | Atef et al. | |
| 2006/0195398 A1 | 8/2006 | Dheer et al. | |
| 2006/0202012 A1 | 9/2006 | Grano et al. | |
| 2006/0273152 A1 | 12/2006 | Fields | |
| 2006/0293981 A1 | 12/2006 | McNelley et al. | |
| 2007/0005514 A1 | 1/2007 | Fieschi et al. | |
| 2007/0100751 A1* | 5/2007 | Carver | 705/44 |
| 2007/0244761 A1 | 10/2007 | Scipioni et al. | |
| 2007/0284436 A1 | 12/2007 | Gland | |
| 2008/0005037 A1 | 1/2008 | Hammad et al. | |
| 2008/0040284 A1* | 2/2008 | Hazel et al. | 705/64 |
| 2008/0052235 A1 | 2/2008 | Mascavage et al. | |
| 2008/0054081 A1 | 3/2008 | Mullen | |
| 2008/0208762 A1* | 8/2008 | Arthur et al. | 705/79 |
| 2010/0235623 A1* | 9/2010 | Simpson et al. | 713/155 |
| 2010/0325002 A1* | 12/2010 | Rothschild | 705/18 |
| 2011/0029396 A1* | 2/2011 | Sobek | 705/17 |
| 2011/0289006 A1* | 11/2011 | Hutchison et al. | 705/79 |

OTHER PUBLICATIONS

Concord EFS, Inc. brochure entitled "Risk Management Services: IDLogix C100 Handheld Terminal- Detecting Invalid and Counterfeit Identification", published on or before 2005, 4 pages.

Primary Payment Systems, Inc. brochure entitled "Deposit Chek- Preventing Losses on . . . Checks and Other Payments at Financial Institutions", 2002, 2 pages.

Primary Payment Systems, Inc. brochure entitled "Risk Management Services: Decision Chek On-Site- Detecting Fraudulent Checks at the Point-of-Sale", 2003, 4 pages.

Primary Payment Systems, Inc. brochure entitled "Risk Management Services: Decision Chek- Preventing Check Losses at the Point-of-Presentment", 2003, 4 pages.

Primary Payment Systems, Inc. brochure entitled "Risk Management Services: Identity Chek-Detecting Fraud when Establishing New Relationships", 2003, 6 pages.

Primary Payment Systems, Inc. brochure entitled "Risk Management Services: Identity Chek- Web and Developer Service", 2003, 4 pages.

U.S. Appl. No. 10/116,689, filed Apr. 3, 2002.

U.S. Appl. No. 10/321,783, filed Dec. 16, 2002.

U.S. Appl. No. 09/975,171, filed Oct. 10, 2001.

U.S. Appl. No. 10/773,642, filed Feb. 6, 2004.

U.S. Appl. No. 10/047,917, filed Jan. 14, 2002.

* cited by examiner

IDENTITY VERIFICATION SYSTEMS AND METHODS

CROSS-REFERENCES TO RELATED APPLICATIONS

This patent application is a continuation of U.S. patent application Ser. No. 11/031,469, entitled "Identity Verification Systems and Methods," filed Jan. 6, 2005, the complete disclosure of which is herein incorporated by reference.

BACKGROUND OF THE INVENTION

Customers of various businesses, such as retail merchants, government entities or financial institutions, are often required to present an identification to complete a transaction. For instance, a merchant may require customer identification for various types of purchases (e.g., alcohol, lottery or tobacco purchases) or when certain types of payments (e.g., checks, credit cards) are presented to pay for transactions. Financial institutions usually require customers to present an identification to complete a withdrawal or deposit transaction, cash a check, or open a new account. Government entities may require identification for access into secure areas or other purposes. Other businesses may also require identification from customers.

Unfortunately, a number of advances have been made in counterfeiting technology which make it increasingly difficult for the naked eye to distinguish legally issued identification documents from fraudulent identification documents. In response, government agencies and other entities are issuing identification documents/cards in which data is encoded within a magnetic stripe and/or two-dimensional barcode. In order to validate and verify the encoded information contained within the magnetic stripe or two-dimensional barcode, a business needs to purchase a hardware device (e.g., an IDLogix C100 Terminal) that will read and validate the encoded data. Thus, businesses must attach yet another hardware device to their existing transaction systems. Additionally, identity verification may add one more processing step that must be completed in a transaction with a customer.

BRIEF SUMMARY OF THE INVENTION

Methods, systems, and machine-readable mediums are disclosed for verifying customer identifications. In one embodiment, the method comprises receiving a communication at a transaction gateway. The communication is associated with a transaction initiated by a customer and includes one or more requests. Each of the requests are associated with a transaction service. The transaction gateway determines whether the communication includes an identity verification request to verify encoded data obtained from an identification presented by the customer. The identity verification request is routed to an identity verification service. A result from the identity verification service is received at the transaction gateway. The result includes one or more identification values obtained from the encoded data. In some aspects, the result may also include a status indicating an outcome of the identity verification. By way of example, the status may indicate the identification is expired, a format associated with the encoded data is invalid, or the identification may be falsified. The result is transmitted to a requester (e.g., point-of-sale device, financial institution computer) associated with the communication. In some embodiments in which the communication includes a plurality of requests, transmitting the result may comprise transmitting a result message having a plurality of results, each result associated with one of the requests.

In further embodiments, the method may comprise parsing, at the identity verification service, the encoded data to obtain the one or more identification values. The identification values may vary depending upon the type of identification presented. For instance, the identification presented may be a driver's license, a state issued identification, a passport, or a military identification. Exemplary identification values obtained may include name, birth data, address, gender, hair color, height, eye color, and/or weight. Other identification values may also be obtained. The identity verification service may also determine a criteria is satisfied indicating the identification may be fraudulent (e.g., the identification has been presented a predetermined number of times within a predetermined time period). The result transmitted by the identity verification service may include information that indicates the identification may be fraudulent. Other status information may also be transmitted by the identity verification service.

Additional requests included in the communication may also be transmitted to other transaction services. For example, the method may additionally comprise determining the communication includes an identity validation request to assess validity of the identification. The identity validation request may be routed to an identity validation service and a validation result may be received indicating an identification validity status assessed by the identity validation service. In one aspect, the identity validation service may assess the validity by comparing at least one of the identification values to a database including suspicious data values. If the identification value matches a suspicious data value, the identity verification service may transmit a validity status indicating a potential fraudulent identification. In another aspect, the identity validation service may assess the validity by matching one of the identification values to a first stored value and retrieving a second stored value associated with the first stored value. The second stored value and a second one of the identification values both have a first attribute type. If the second identification value does not match the second stored database value, the identity verification service may transmit a validity status indicating an alert.

Another example of a type of request that may be included in the communication is a check validation request. Thus, the method may comprise determining that the communication includes a check validation request to analyze a loss potential associated with a check presented for payment for the transaction and routing the check validation request to a check validation service.

In a second embodiment, a method is disclosed which comprises receiving a communication at a transaction gateway. The communication is associated with a transaction initiated by a customer. A determination is made that the communication includes a plurality of transaction service requests and that one of the transaction service requests is an identity verification request to verify encoded data obtained from an identification presented by the customer. The first transaction service request is transmitted to an identity verification service. A second transaction service request is also transmitted from the transaction gateway to a second transaction service. The transaction gateway receives a result from both the identity verification service and the second transaction service. The transaction gateway then transmits a response to a requester associated with the communication. The response includes the first result and the second result.

In a third embodiment, a system is disclosed which comprises a communications interface, to receive a communication associated with a transaction initiated by a customer and to receive an identity verification result from an identity verification service and one or more additional results. Logic is communicatively coupled with the communications interface. The logic is configured to determine the communication includes an identity verification request to verify encoded data obtained from an identification presented by the customer and to transmit the identity verification request to the identity verification service. Logic also determines the communication includes one or more additional transaction service requests for the transaction and transmits each of the additional transaction service requests to a transaction service associated with the respective additional transaction service request. Logic also is configured to transmit a response to a requester associated with the communication. The response includes the identity verification result and the one or more additional results.

The system may also comprise the identity verification service to obtain one or more identification values from the encoded data and to transmit the identity verification result to the communications interface. A data store may be communicatively coupled with the identity verification service. The data store stores identity information for a plurality of identifications. The identity verification service may further be configured to compare the one or more identity values obtained from the encoded data to information in the data store to determine if the identification may be fraudulent.

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
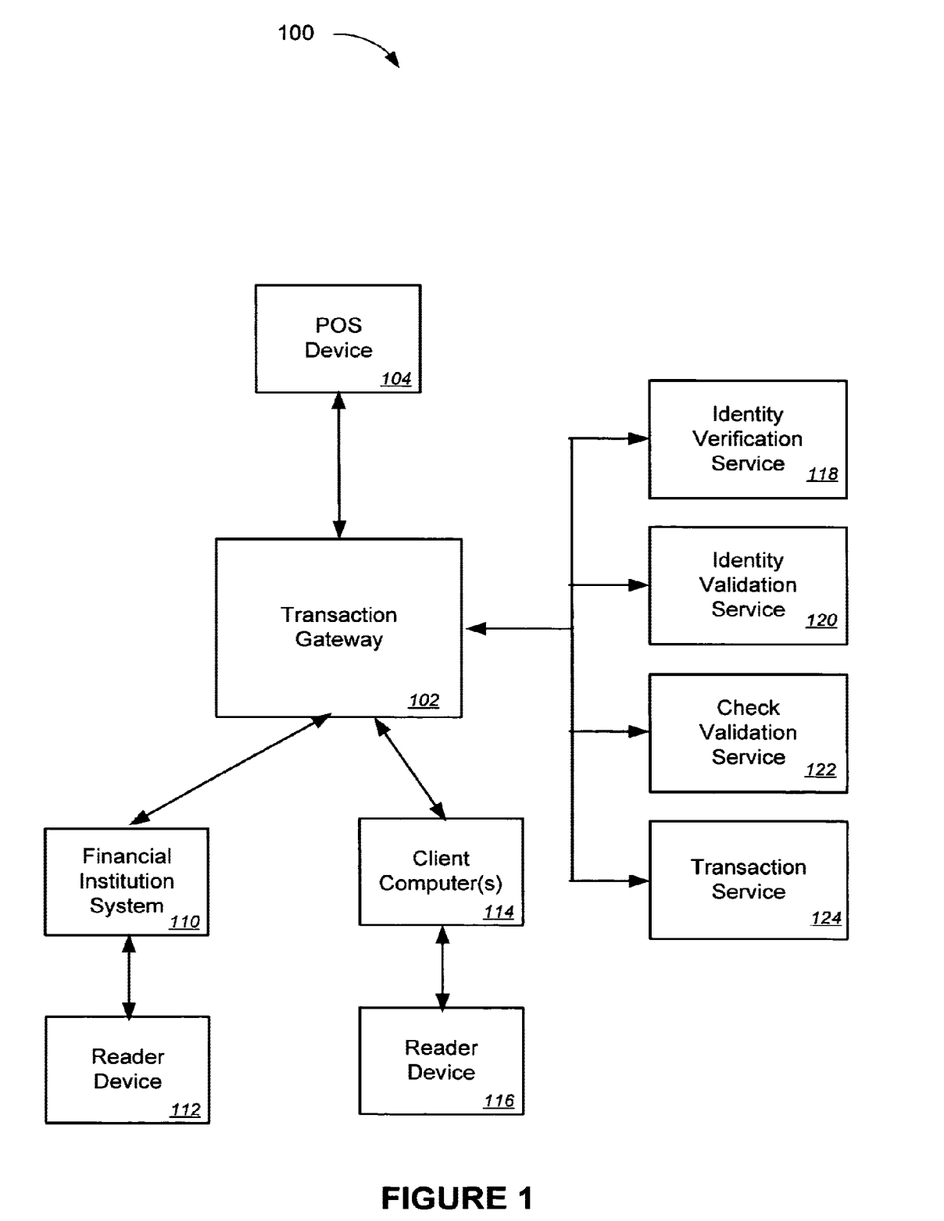
FIG. 1 illustrates an exemplary embodiment of a transaction system.

FIG. 1 illustrates an exemplary embodiment of a transaction system 100. The transaction system 100 includes a transaction gateway 102 communicatively coupled with point-of-sale device(s) 104, financial institution(s) 110, and client computer(s) 114. The transaction gateway 102 is also communicatively coupled with a plurality of transaction services, such as identity verification service 118, identity validation service 120, check verification service 122, and other transaction service(s) 124.

Point-of-sale device(s) 104 may be used to perform merchant and/or customer functions related to transactions initiated by customers, such as a transaction for the purchase of goods or services or a money transfer transaction. For example, point-of-sale device(s) 104 may be used to receive payment (e.g., check, credit card, debit card, stored value card, or other payment type) for the transaction from the customer. As another example, point-of-sale device(s) 104 may be used by an agent to enter details of a money transfer transaction (e.g., recipient information, money transfer amount) using point-of-sale device. In some instances, the merchant may require the customer to present an identification to complete the transaction. The identification may be used to verify the customer's identity. Thus, point-of-sale device(s) 104 may include a magnetic card reader, a two dimensional bar code reader, a smart chip reader, or other component to read encoded data on identifications presented by customers. Point-of-sale device(s) 104 may also include other components and perform other functions, such as one or more of the components or functionality described in U.S. application Ser. No. 10/116,689, entitled "Systems and Methods for Performing Transactions at A Point-of-Sale", filed Apr. 3, 2002, the details of which are hereby incorporated by reference.

Financial institution system(s) 110 may be used to perform teller functions, loan services, new account creations, or other types of functions needed for customer transactions. A financial institution may require the customer to present identification to verify the customer's identity in order to complete a transaction. Thus, financial institution system(s) may be communicatively coupled with reader device(s) 112 to read encoded data on identifications. By way of example, reader device(s) 112 may be magnetic card readers, two-dimensional bar code readers, smart chip readers, or other type of reader device used to read data encoded on identifications.

Other types of client computer(s) 114 may also be communicatively coupled with transaction gateway 102. For example, a client computer 114 may be used to process patient transactions for a doctor or hospital. As another example, a client computer 114 may be used to process transactions for a government agency. As with merchant and financial transactions, entities interacting with customers may require customers to present identifications. Similar to reader device(s) 112, reader device(s) 116 may be communicatively coupled with client computer(s) 114 and used to read encoded data on identifications presented by a customer.

Transaction details may be submitted to a transaction gateway 102 by point-of-sale device(s) 104, financial institution system(s) 110, or client computer(s) 114 in communications submitted to a transaction gateway 102. A communication may include one or more requests to perform a transaction service to process the transaction and transaction details. Transaction gateway 102 may then be used to route requests included in a communication to the appropriate transaction service. In some embodiments, transaction gateway 102 may also include additional logic to determine whether and when to process requests received in a communication. Some transaction service requests may be routed simultaneously to the appropriate transaction service 118, 120, 122, 124. Other transaction service requests may be routed after results have been received from a previously routed transaction service request. In some instances, transaction gateway 102 may not route some of the requests based on results from previous requests.

One example of a request that may be included in a communication to transaction gateway 102 is an identity verification request. An identity verification request may include encoded data associated with an identification presented by a customer. By way of example, the encoded data may have been read from a driver's license, a state issued identification, a passport, a military identification, a health card, or other type of identification presented by a customer. Transaction gateway 102 may route the identity verification request to an identity verification service 118. As will be described in further detail with reference to FIG. 5, identity verification service 118 may be used to obtain one or more identity values from the encoded data.

In some embodiments, identity verification service 118 may also be used to transmit a status indicating an outcome of the identity verification process. For example, the status may indicate whether the identification is expired or whether the encoded data format is invalid. In some embodiments, status information may indicate whether the identification may be falsified. In those embodiments, identity verification service may be communicatively coupled with a data store (e.g., a relational or other type of database, text file, internal software lists, or other type of data storage). The data store (not shown) may store information used by the identity verification service to assess whether an identity may be fraudulent. For example, the data store may store identifications which are known to be fraudulent. Other information may also be stored and used by identity verification service to verify identifications. In other embodiments, identity verification service 118 may not be communicatively coupled with a data store.

Another example of a request that may be included in a communication to transaction gateway is an identity validation request. Transaction gateway 102 may route an identity validation request to an identity validation service 120. Identity validation service 120 may then be used to assess the validity of the identification. In some instances, the communication received at the transaction gateway, which included the identity validation request, may include identity values associated with an identification presented by a customer. Alternatively, transaction gateway 102 may wait until identity values obtained from encoded data are received from an identity verification service 118 and then transmit the identity validation request and the identity values to identity validation service 120.

Identity validation service 120 may use the identification values to determine whether the identification presented may be fraudulent or is otherwise problematic. A result indicating an outcome of the identity validation may then be transmitted by identity validation service 120 to transaction gateway 102. In some embodiments, the identity validation service 120 may compare one or more of the identification values to a database including suspicious values. If there is a match, identity validation service 120 may transmit a response indicating an alert status. Alternatively or additionally, identity validation service 120 may match one or more of the identification values to stored values in a data store. Stored values associated with the matched stored value may be retrieved and compared to other identification values received by the identity validation service 120. If one or more of the stored values do not match one or more of the received identity values, an alert status may be transmitted by the identity validation service 120. As an example, identity validation service 120 may receive a social security number as one of the identity values. The social security number may be used to retrieve stored values associated with the social security number, such as a name. If one or more of the retrieved stored values (e.g., name, address, etc.) does not match the corresponding identity value received by the identity validation service 120, the identity validation service 120 may determine the identity may be fraudulent and may transmit an alert status. Additional information about the identity validation may also be transmitted by identity validation service 120. It should be appreciated that other identity values associated with attributes other than social security number may alternatively or additionally be used by identity validation service 120 to retrieve stored information. Additional details of an account verification database and methods that may be used by an identity validation service may be found in U.S. application Ser. No. 10/773,642, entitled "Account-Owner Verification Database", filed Feb. 6, 2004, the details of which are hereby incorporated by reference.

A third example of a request that may be included in a communication transmitted to transaction gateway 102, is a request to validate a check presented by a customer as payment or partial payment for a transaction. Transaction gateway 102 may route the check validation request to check validation service 122. Check verification service 122 may then analyze a loss potential associated with the check. A result of the check validation may then be transmitted back to transaction gateway 102. Further details of an exemplary check validation system may be found in U.S. application Ser. No. 10/047,917, entitled "System and Method for Overturning of Risk Evaluation Performed by Risk Model to Control Financial Risk", filed Jan. 14, 2002, the details of which are hereby incorporated by reference.

Other types of requests may also be included in a communication received at transaction gateway 102. Transaction gateway 102 may route these requests to the appropriate transaction service 124. By way of example, the communication may include a money transfer request. Transaction gateway 102 may route the money transfer request to a money transfer system. Further details of exemplary money transfer transactions and systems are disclosed in U.S. application Ser. No. 09/975,171, entitled "Method and System for Performing Money Transfer Transactions, filed on Oct. 10, 2001, the details of which are hereby incorporated by reference. In some embodiments, transaction gateway 102 may include logic to determine whether to process the money transfer request based on the outcome of other requests included in the communication. For instances, if identity validation service 118 transmits a result indicating the identification presented may be fraudulent or check verification service indicates a check may not be valid, the transaction gateway 102 may not route the money transfer request to the money transfer system. As another example, a money transfer may not be processed if the customer identity is on a prohibited list, such as the OFAC SDN list. Exemplary systems and methods that may be used to check a customer identity before processing a money transfer request may be found in U.S. application Ser. No. 10/321,783, entitled "Methods and Systems for Processing Transaction Requests", filed Dec. 16, 2002, the details of which are hereby incorporated by reference.

It should be appreciated that in alternative embodiments, transaction system 100 may include additional or fewer components than illustrated. For instances, transaction system 100 may not include financial institution system 110 and/or client computer 114 or alternatively may not include point-of-sale device 104. As another example, transaction gateway 102 may be communicatively coupled with additional or fewer transaction services 118, 120, 122, 124. Other variations are also contemplated.

Figure 2:
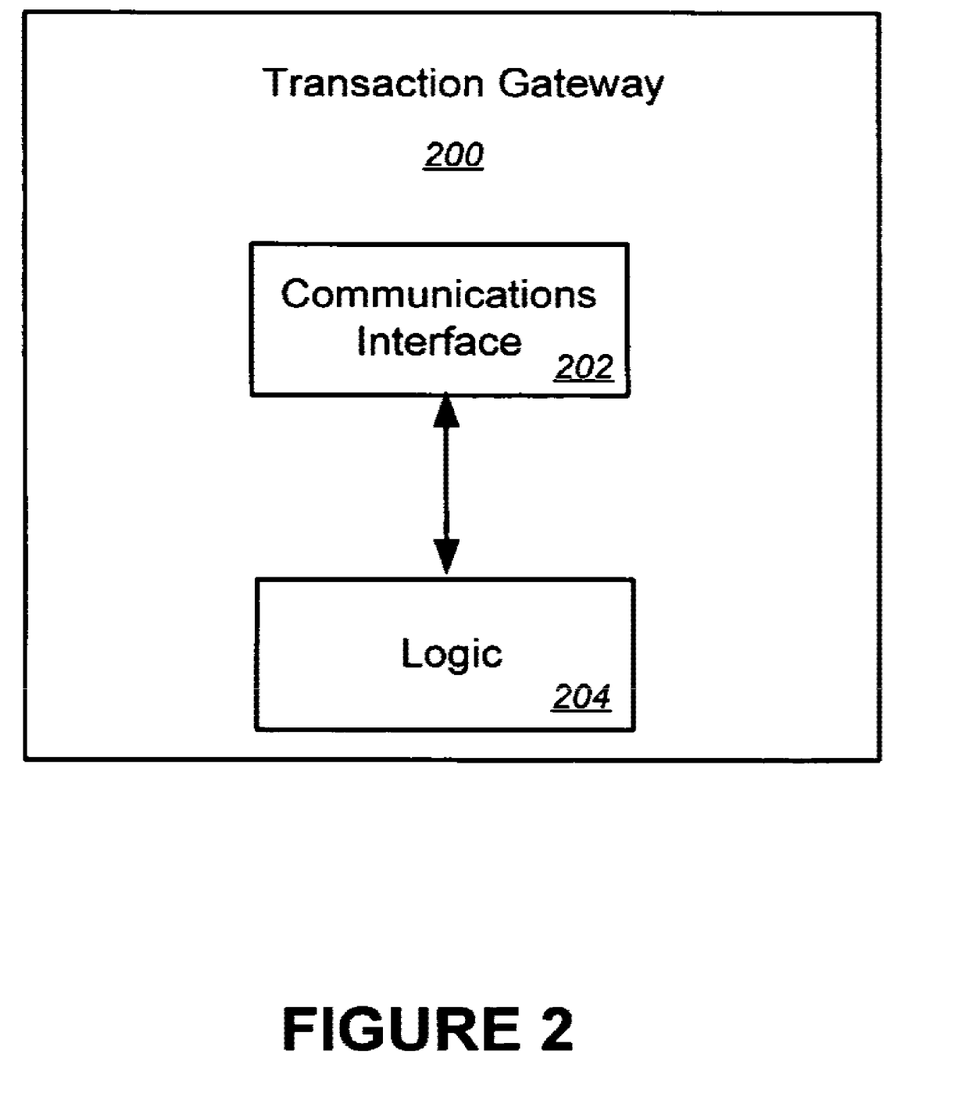
FIG. 2 is a block diagram of an exemplary identity verification service that may be used to verify identifications.

FIG. 2 illustrates an exemplary embodiment of a transaction gateway 200 that may be used to route requests included in a communication to one or more transaction services. Transaction gateway 200 may include logic 206 communicatively coupled with communications interface 202. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that communications interface 202, logic 206 or components of logic 206 may reside on the same or different physical devices.

Communications interfaces 202 may be used to receive communications associated with customer transactions. Communications interfaces 202 may also be used to receive results from transaction services. By way of example, communications interface 202 may include an interface to a wide area network (WAN), such as the Internet or proprietary networks. Alternative or additional types of interfaces may also be included as components of communications interface 202.

Logic 206 may be one or more software programs, one or more components of a software program (e.g., function or program object), firmware, or other type of machine-executable instructions. In one embodiment, logic 206 may include a web service accessed by point-of-sale devices, financial institution systems, or other types of clients. Logic 206 may be used to route requests included in a transaction communication to the appropriate transaction service and to transmit a response indicating the results of the transaction service processing. Thus, logic 206 may be configured to determine the types of requests included in a communication and to route the request accordingly. For example, if the communication includes an identity verification request, logic 206 may be configured to transmit the identity verification request to an identity verification service. As previously described, in some instances, logic 206 may transmit transaction service requests simultaneously, while in other instances, logic 206 may order transaction service requests, may include the results of a transaction request (e.g., identity values obtained from encoded data) in a request submitted to a second service, and/or may not transmit one or more of the requests included in a communication based on the outcome of a previous transaction request. Additional details of functionality that may be performed by logic 206 will be described in detail below with reference to FIG. 4.

Figure 3:
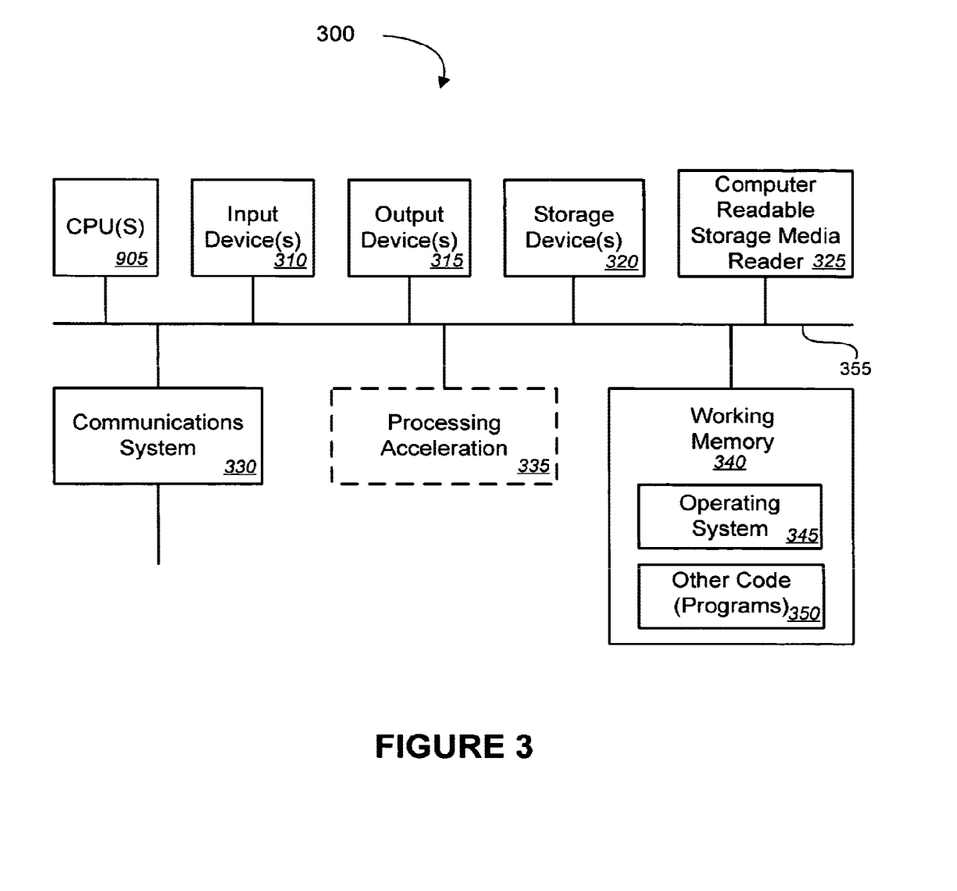
FIG. 3 is a block diagram of an exemplary computer system upon which components of the transaction system may be implemented.

FIG. 3 illustrates one embodiment of a computer system 300 upon which components of a transaction system (e.g., transaction gateway, identity verification service) may be implemented. The computer system 300 is shown comprising hardware elements that may be electrically coupled via a bus 355. The hardware elements may include one or more central processing units (CPUs) 305; one or more input devices 310 (e.g., a scan device, a mouse, a keyboard, etc.); and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325; a communications system 330 (e.g., a modem, a network card (wireless or wired), an infra-red communication device, etc.); and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with a network and/or any other computer or other type of device, such as a POS device.

The computer system 300 may also comprise software elements, shown as being currently located within a working memory 340, including an operating system 345 and/or other code 350, such as an application program. The application programs may implement a framework, components of a framework, and/or the methods of the invention. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Figure 4:
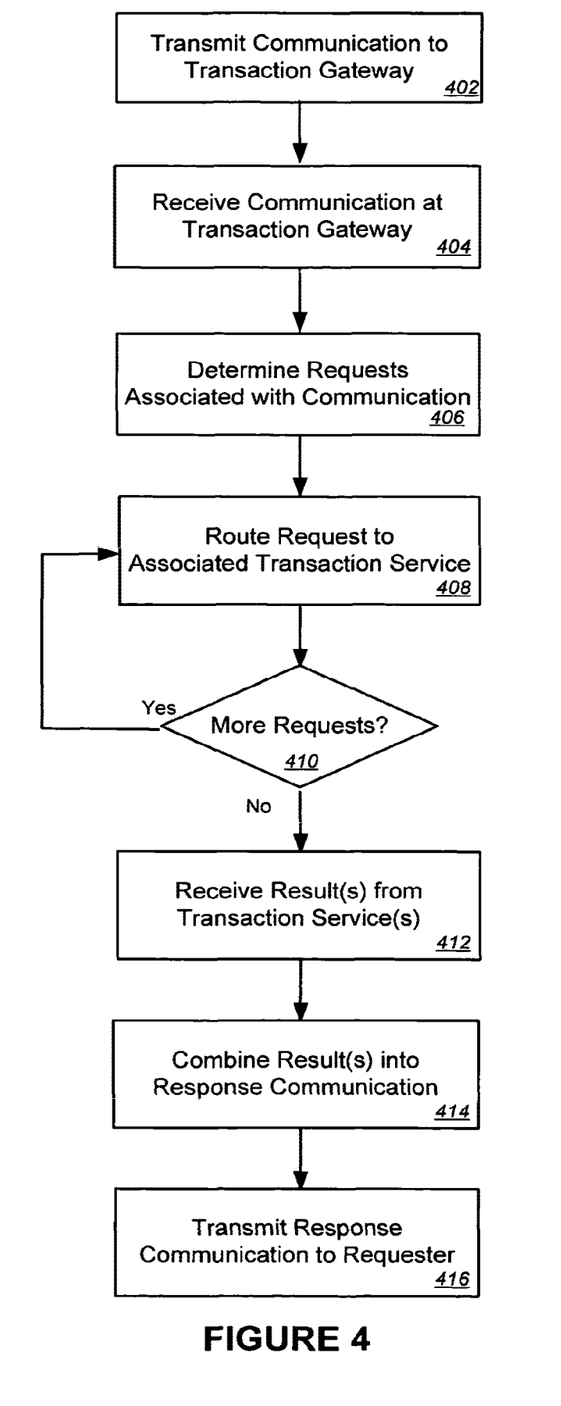
FIG. 4 is a flow diagram illustrating an exemplary method that may be used to process a customer transaction.

FIG. 4 is a flow diagram illustrating an exemplary method that may be used to process a customer transaction. A point-of-sale device, financial institution system, or other client computer may transmit 402 transaction details for a customer transaction to a transaction gateway. The details may include information, such as the transaction amount and payment information. The communication may also include one or more requests for transaction services needed to process the transaction.

The communication is received 404 at the transaction gateway. In one embodiment, the transaction gateway may include a web service and the communication may be a Simple Object Access Protocol (SOAP) message or Extended Markup Language (XML) message. In embodiments in which the communication is a SOAP message, the header may include a requester identity, and a request segment count indicating the number of requests included in the message. Each request may be included in a segment which identifies the type of request and includes one or more fields related to the request. For example, an identity verification request may include the requester identity and the encoded data read from the identification. Other communication formats may also be used.

The transaction gateway may then determine 406 the requests associated with the communication. One of the requests is routed 408 to the associated transaction service. By way of example, an identity verification request may be routed to an identity verification service. If there are more requests 410, those are also routed 408 to the associated transaction service. As previously described, transaction gateway may route some of the requests simultaneously, while other requests may depend on the results of a previously routed 408 request. Thus, an identity validation request may not be routed 408 until identity values have been obtained from encoded data by an identity verification service. Additionally, in some instances, some requests may not be routed 408, if a previously result indicates the transaction processing should not continue. Thus, for example, if an identity verification service is unable to obtain identity values from encoded data, a request to perform identity validation may not be routed 408. As another example, if there is an indication an identification may be fraudulent, a check verification request may not be routed. Other logic may also be performed by a transaction gateway to determine when and how to route requests for transaction services included in a received communication.

In some aspects, transaction gateway may receive 412 results from the transaction services to which requests were routed. The results may each indicate a result of the respective transaction service processing. As previously described, transaction gateway may use these results in routing other transaction service requests. Alternatively, results may be transmitted directly to a requester associated with the communication by one or more of the respective transaction services and/or the transaction services may send results to other transaction services.

The transaction gateway may combine 414 the results received into a response communication to be transmitted back to the requester associated with the received 404 communication. For example, transaction gateway may create a SOAP message with a header indicating the number of results, and segments for each result. The result communication may then be transmitted 416 to the requester. Alternatively, transaction gateway may transmit each result separately or in different combinations.

Figure 5:
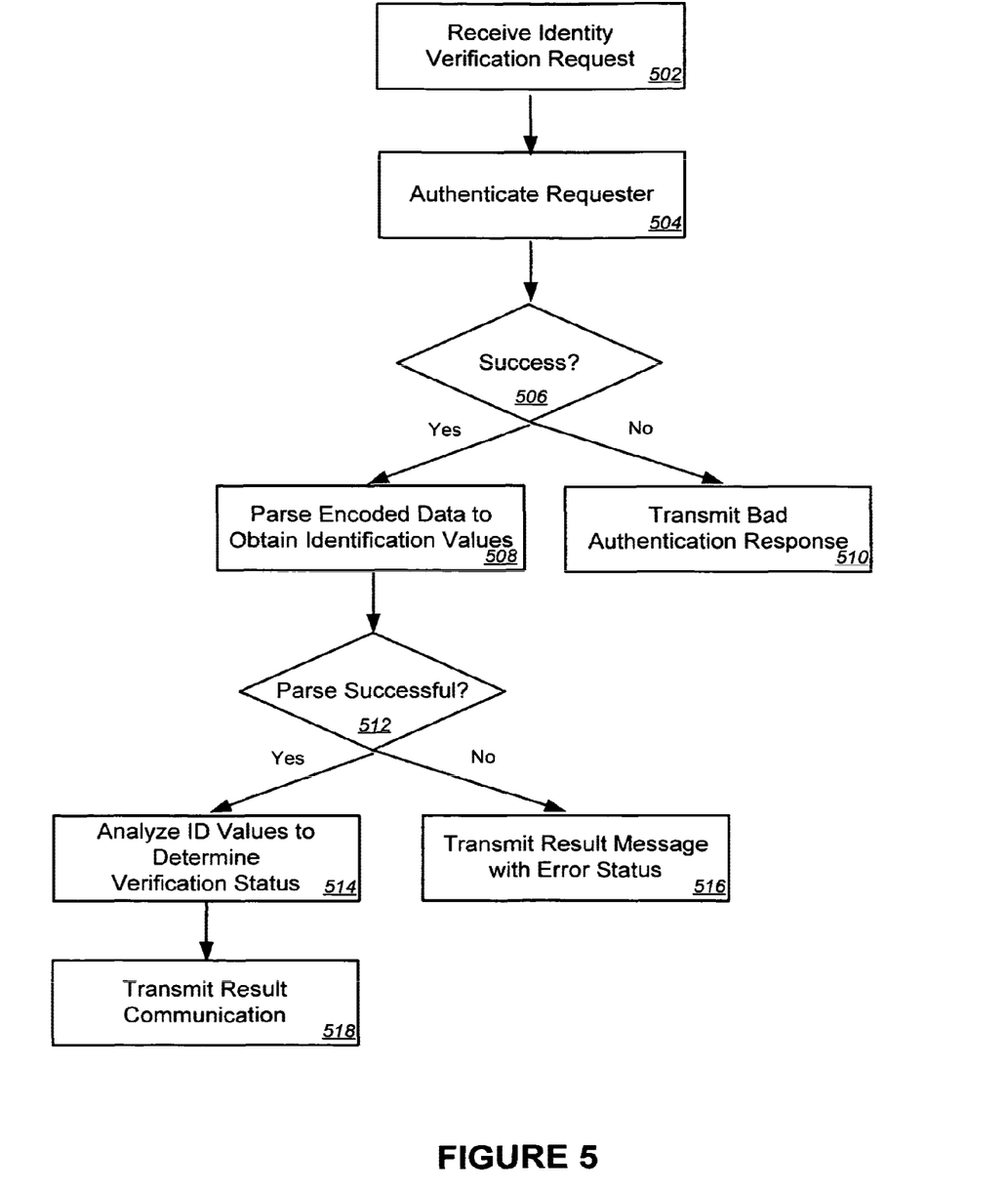
FIG. 5 is a flow diagram illustrating an exemplary identity verification process.

FIG. 5 is a flow diagram of an exemplary identity verification process that may be used by an identity verification service. The identity verification process may begin by receiving 502 an identity verification request. The identity verification request includes encoded data read from an identification. By way of example, the encoded data may be magnetic stripe data, two-dimensional bar code data, smart card data, or other type of data. The identification may be a state issued identification, a driver's license, a passport, a military identification, or other type of identification.

The identity verification request received 502 may also include a requester identification. The requester identification may be authenticated 504 by the identity verification service. If the authentication is not successful, a bad authentication response may be transmitted 510 and processing may be terminated. This may prevent unauthorized use of the identity verification service. In other embodiments, the requester may not be authenticated or may be authenticated by another component of a transaction system, such as transaction gateway.

If 506 the requester is successfully authenticated, the identity verification service may attempt to parse 508 the encoded data to obtain one or more identification values from the encoded data. The parsing 508 may include a determination of the type of identification, the type of encoded data, and/or the issuing authority. Appropriate algorithms may be used depending upon this information. If 512 to parse 508 the encoded data is not successful, a result message may be transmitted by the identity verification service indicating the error status (e.g., encoded data has invalid format or is otherwise problematic).

If the parse is successful, one or more identity values are obtained from the encoded data. The identity values obtained may vary depending upon the type of identification and issuing authority. By way of example, the identification values may include one or more of first/last name, identification number, address, birth date, gender, hair color, height, eye color, weight, restrictions, or other information included in the encoded data obtained from the identification.

The identity values obtained 508 may be analyzed 514 to determine one or more verification statuses for the identification. For example, the analysis may indicate the identification is expired, there are alcohol or tobacco restrictions because of age, or other information. The analysis 508 may also indicate that one or more criteria are satisfied indicating the identification may be fraudulent. For example, one or more of the identity values obtained may be compared to a data store of known or suspicious identifications. As another example, one or more identity values may be missing that should have been included. In some aspects, the criteria may include analyzing the number of times an identity has been presented in a predefined time period to determine if a predefined threshold has been exceeded. If criteria are satisfied, the identity verification service may determine 514 the verification status should indicate the identity may be fraudulent. The status(es) may alternatively or additionally include other outcomes of the identity verification process.

Identity verification service may then transmit 518 a result communication to either a transaction gateway, the identity verification requester, or another transaction service. The result may include the obtained identity values. The result may also include one or more statuses, such as those previously described, indicating the outcome of the identity verification. The identity values may ultimately be compared by the requester to the physical identification to determine if the values match. Alternatively, this information may have also been transmitted to the transaction gateway for a transaction service (e.g., identity verification service or identity validation service) to perform the analysis on whether the values match.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
receiving, at a transaction gateway, a communication that includes one or more requests, each of the requests associated with a transaction service;
determining, at the transaction gateway, that the communication includes an identity verification request to verify identification data purportedly identifying an individual;
routing the identity verification request to an identity verification service, wherein the identity verification service comprises a processing unit, memory, a communications interface and one or more software programs, wherein the identity verification service receives the identity verification request via the communications interface;
receiving, at the transaction gateway, a result from the identity verification service, the result including one or more identification values obtained from the identification data; and
transmitting the result to a requester associated with the communication;
further comprising parsing, at the identity verification service, the identification data to obtain the one or more identification values, wherein parsing occurs using the processing unit and the one or more software programs of the identity verification service;

determining, at the identity verification service, whether a criteria is satisfied indicating the identification data may be fraudulent; and transmitting, from the identity verification service, the result which indicates that the identification data may be fraudulent; and wherein the transaction gateway is operable to route a plurality of the requests from the communication to a plurality of different corresponding transaction service providers.

2. The method of claim 1, wherein receiving the result comprises receiving a status indicating an outcome of the identity verification.

3. The method of claim 2, wherein the status indicates the identification is expired.

4. The method of claim 2, wherein the status indicates the identification may be falsified.

5. The method of claim 2, wherein the status indicates a format associated with the encoded data is invalid.

6. The method of claim 1, wherein determining the criteria is satisfied comprises determining the identification has been presented a predetermined number of times within a predetermined time period.

7. The method of claim 1, wherein parsing the encoded data comprises obtaining an identification type from the identification data.

8. The method of claim 7, wherein the identification type is one of a driver's license, a state issued identification, a passport, and a military identification.

9. The method of claim 1, wherein parsing the encoded data comprises obtaining, from the identification data, at least one of a name, a birth date, an address, a gender, a hair color, a height, an eye color, and a weight.

10. The method of claim 1, wherein parsing the identification data comprises determining a format associated with the identification data.

11. The method of claim 10, wherein determining the format comprises determining the format is one of magnetic strip data, two-dimensional bar code data, or smart card data.

12. The method of claim 1, wherein the communication is associated with a requester, the method further comprising:
authenticating the requester before parsing the identification data.

13. The method of claim 1, further comprising:
determining the communication includes an identity validation request to assess validity of the identification;
routing the identity validation request to an identity validation service; and
receiving a validation result indicating an identification validity status assessed by the identity validation service.

14. The method of claim 13, further comprising:
at the identity validation service, comparing at least one of the identification values to a database including suspicious data values; and
if the identification value matches a suspicious data value, setting the validation status to an alert status.

15. The method of claim 13, further comprising:
at the identify validation service, matching a first one of the identification values to a first stored value;
retrieving a second stored value associated with the first stored value, the second stored value and a second one of the identification values both associated with a first identify attribute; and
if the second identification value does not match the second stored database value, setting the validation status to an alert status.

16. The method of claim 1, further comprising:
determining the communication include a check validation request to analyze a loss potential associated with a check presented for payment for the transaction; and
routing, at the transaction gateway, the check validation request to a check validation service.

17. The method of claim 1, wherein the communication includes a plurality of requests, and wherein transmitting the result comprises transmitting a result message having a plurality of results, each result associated with one of the requests.

18. The method of claim 1, wherein transmitting the result comprises transmitting the result to a point-of-sale device.

19. The method of claim 1, wherein transmitting the result comprises transmitting the result to a financial institution system.

20. The method of claim 1, wherein receiving a communication comprises receiving one of a Simple Object Access Protocol (SOAP) message or an Extended Markup Language (XML) message.

21. A method comprising:
receiving a communication at a transaction gateway;
determining at the transaction gateway that the communication includes a plurality of transaction service requests;
determining a first one of the transaction service requests included in the communication is an identity verification request to verify identification data purportedly identifying an individual, wherein the identification data is to be verified to determine whether the identification data proffered by a customer is in a correct format or expired;
transmitting, from the transaction gateway, the first transaction service request to an identity verification service;
transmitting, from the transaction gateway, a second transaction service request included in the communication to a second transaction service, wherein the second transaction service request is to determine whether the identification data is being used in connection with other data that is not expected to be associated with the identification data, thus indicating that the identification data may be associated with fraudulent activity;
receiving, at the transaction gateway, a first result from the identity verification service, wherein the first result indicates whether the one or more verification values is correctly formatted or expired, thus indicative of whether the verification values may be fraudulent;
receiving, at the transaction gateway, a second result from the second transaction service, wherein the second result indicates whether the identification is associated with fraudulent activity; and
transmitting, from the transaction gateway, a response to a requester associated with the communication, the response including the first result and the second result.

22. The method of claim 21, further comprising:
at the identity verification service, attempting to obtain one or more identification values from the identification-data;
if the attempt is unsuccessful, transmitting, from the identity verification service, the first result to the transaction gateway, the first result including an error status; and
if the attempt is successful, transmitting, from the identity verification service, the first result to the transaction gateway, the first result message including the one or more identification values.

23. The method of claim 22, wherein if the attempt is successful, the transmitting the first result message further includes transmitting a status associated with the identity verification.

24. A system comprising:
- a communication interface, to receive a communication and to receive an identity verification result from an identity verification service and one or more additional results, wherein the identity verification result is obtained by determining whether the identification data is in a correct format or expired, thus indicative of whether the one more verification values may be fraudulent and wherein the one or more additional results are obtained by determining whether the identification data is being used in connection with other data that is not expected to be associated with the identification data; and
- logic, communicatively coupled with the communication interface, to determine the communication includes an identity verification request to verify identification data that purportedly identifies an individual, wherein the identification data is to be verified to determine whether the identification data proffered by the individual is in a correct format or expired, to transmit the identity verification request to the identity verification service, to determine the communication includes one or more additional transaction service requests for the transaction, including a request to determine whether the identification data is being used in connection with other data that is not expected to be associated with the identification data, thus indicating that the identification data may be associated with fraudulent activity, to transmit each of the additional transaction service requests to a transaction service associated with the respective additional transaction service request, and to transmit a response to a requester associated with the communication, the response including the identity verification result and the one or more additional results, wherein the identity verification result indicates whether the verification values are correctly formatted or expired, and wherein the one or more additional results indicates whether the identification is associated with fraudulent activity.

25. The system of claim 24, further comprising the identity verification service to obtain one or more identification values from the identification data and to transmit the identity verification result to the communications interface, the identity verification result including the one or more identification values.

26. The system of claim 25, further comprising:
- a data store, communicatively coupled with the identity verification service, to store identity information for a plurality of identifications;
- and wherein the identity verification service is further to compare the one or more identity values obtained from the identification data to information in the data store to determine if the identification may be fraudulent and to include a status indicator in the identity verification result based at least in part on the comparison.

27. A method comprising:
- receiving, at a transaction gateway, a communication that includes one or more requests, each of the requests associated with a transaction service;
- determining, at the transaction gateway, that the communication includes an identity verification request to verify identification data purportedly identifying an individual, wherein the identification data is to be verified to determine whether the identification data proffered by the individual is in a correct format or expired;
- routing the identity verification request to an identity verification service;
- receiving, at the transaction gateway, a result from the identity verification service, the result indicating whether the one or more identification values obtained from the data are correctly formatted or expired;
- transmitting the result to a requester associated with the communication;
- determining at the transaction gateway that the communication includes an identity validation request to assess validity of the identification;
- routing the identity validation request to an identity validation service; and
- receiving at the transaction gateway a validation result indicating an identification validity status assessed by the identity validation service, wherein the validity status includes the results of a determination as to whether the identification data is being used in connection with other data that is not expected to be associated with the identification data, thus indicating that the identification data may be associated with fraudulent activity; and
- transmitting the validation result to the requester.

28. A method comprising:
- receiving, at a transaction gateway, a communication that includes one or more requests, each of the requests associated with a transaction service, wherein a transaction gateway comprises a processing unit, a memory, a communications interface and one or more software programs, wherein the transaction gateway receives the request via the communications interface;
- determining, at the transaction gateway, the communication includes an identity verification request to verify identification data purportedly identifying an individual, wherein the determination is made using the processor and the one or more software programs;
- routing the identity verification request to an identity verification service;
- receiving, at the transaction gateway, a result from the identity verification service, the result including one or more identification values obtained from the identification data, wherein the result is received at the communications interface;
- transmitting the result to a requester associated with the communication;
- determining the communication includes an identity validation request to assess validity of the identification;
- routing the identity validation request to an identity validation service; and
- receiving a validation result indicating an identification validity status assessed by the identity validation service;
- at the identity validation service, matching a first one of the identification values to a first stored value;
- retrieving a second stored value associated with the first stored value, the second stored value and a second one of the identification values both associated with a first identity attribute; and
- if the second identification value does not match the second stored database value, setting the validation status to an alert status; and
- wherein the transaction gateway is operable to route a plurality of the requests from the communication to a plurality of different corresponding transaction service providers using the transaction interface.

29. A method comprising:
receiving, at a transaction gateway, a communication that includes one or more requests, each of the requests associated with a transaction service;
determining, at the transaction gateway, the communication includes an identity verification request to verify identification data purportedly identifying an individual;
routing the identity verification request to an identity verification service;
receiving, at the transaction gateway, a result from the identity verification service, the result including one or more identification values obtained from the identification data; and
transmitting the result to a requester associated with the communication; and
wherein the communication includes a plurality of requests, and wherein transmitting the result comprises transmitting a result message having a plurality of results, each result associated with one of the requests;
wherein one of the results that is associated with one of the requests is produced by determining at the transaction gateway that one of the requests is an identity validation request to assess validity of the identification;
routing the identity validation request to an identity validation service; and
receiving at the transaction gateway a validation result indicating an identification validity status assessed by the identity validation service, wherein the validity status includes the results of a determination as to whether the identification data is being used in connection with other data that is not expected to be associated with the identification data, thus indicating that the identification data may be associated with fraudulent activity.

* * * * *